United States Patent [19]

Buchy et al.

[11] 4,258,569

[45] Mar. 31, 1981

[54] SELF-REGULATED DEVICE FOR TEMPERATURE STABILIZATION OF AT LEAST ONE CONNECTION POINT, AND TEMPERATURE-CONTROLLED PLUG-IN CONNECTOR FOR THE USE OF SAID DEVICE

[75] Inventors: François Buchy; Jacques Cadier, both of Paris, France

[73] Assignee: Thomson-CSF, Paris, France

[21] Appl. No.: 65,339

[22] Filed: Aug. 9, 1979

[30] Foreign Application Priority Data

Aug. 11, 1978 [FR] France ............................ 78 23674
Jan. 26, 1979 [FR] France ............................ 79 02097

[51] Int. Cl.³ .......................................... G01K 7/22
[52] U.S. Cl. ........................... 73/343 R; 73/362 AR; 73/362.4; 219/505
[58] Field of Search ............ 73/362.4, 362.5, 362 SC, 73/362 AR, 361, 343 R; 219/511, 505

[56] References Cited

U.S. PATENT DOCUMENTS 2,851,574 9/1958 Linhart, Jr. et al. ................ 219/505

*Primary Examiner*—Donald O. Woodiel
*Attorney, Agent, or Firm*—Oblon, Fisher, Spivak, McClelland & Maier

[57] ABSTRACT

The device makes use of a simple and inexpensive mechanism for temperature stabilization of one or a number of points of an electric circuit such as the free ends of the bimetallic conductors of a thermocouple, or a connector designed to receive one or a number of pins connected to an electric circuit. A good thermal contact is established between the point to be temperature-controlled and a positive-temperature-coefficient resistor which may be surrounded by a second resistor of the same type. The resistors are supplied at constant voltage. One example of the connector consists of a metallic casing surrounding a resistor in the form of a cylindrical sleeve placed around a second resistor in the form of a cylindrical sleeve in which one or a number of jacks are embedded in heat-conducting material.

5 Claims, 17 Drawing Figures

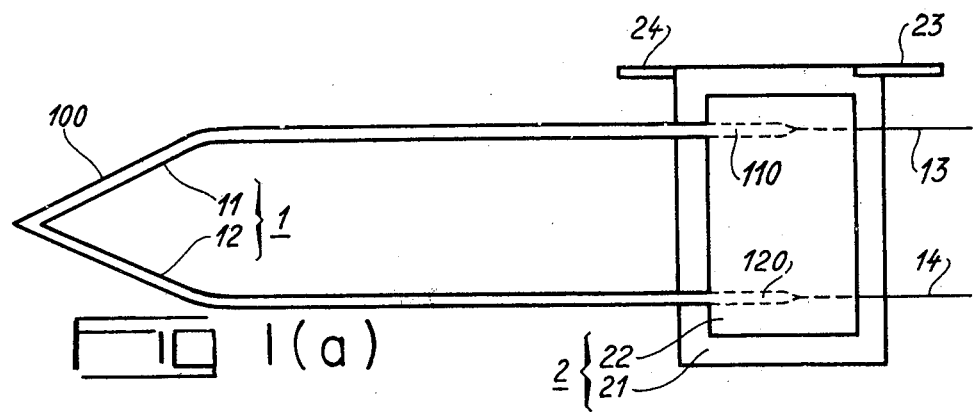
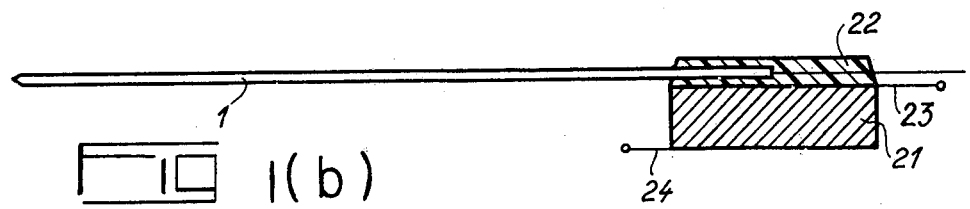
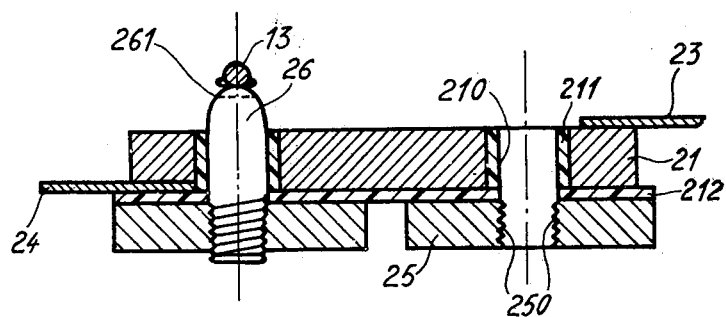

SELF-REGULATED DEVICE FOR TEMPERATURE STABILIZATION OF AT LEAST ONE CONNECTION POINT, AND TEMPERATURE-CONTROLLED PLUG-IN CONNECTOR FOR THE USE OF SAID DEVICE

BACKGROUND OF THE INVENTION

Field of the Invention

This invention relates to a self-regulated device for temperature-stabilization of at least one connection point and to a plug-in connector which makes use of the device.

A first application of the invention relates to a thermoelectric couple or thermocouple formed by two suitably chosen conductors joined together at one end by soldering or welding. This device constitutes a temperature sensor which is very frequently used for measuring or regulating temperatures within a range of approximately −200° C. to over 1800° C.

Depending on the temperature range to be controlled, the pair of conductors is selected for example as follows:

from approximately −150° C. to 400° C., copper and constantan (mean sensitivity of the thermocouple: 50 microvolts per degree centigrade);
from −50° C. to 1100° C., chromel and alumel (sensitivity of 40 $\mu V/°C.$);
from 100° C. to 1500° C., platinum and platinum alloyed with 10% rhodium (sensitivity of 10 $\mu V/°C.$);
from 500° C. to 1800° C., tungsten and tungsten alloyed with 20% rhenium (sensitivity of 15 $\mu V/°C.$).

It is known that the electromotive force which appears at the open ends of the thermocouple depends on the difference in temperature between the joined ends or junction and the free ends of the two metals or alloys (these latter being maintained at the same temperature). This electromotive force therefore provides a measurement of the difference in temperature and not an absolute measurement of temperature. If V designates the voltage measured with a millivoltmeter and expresses the electromotive force existing between the points mentioned heretofore, and if E(T) designates the function which gives said electromotive force from a reference temperature $T_o$, calibration of the thermocouple is in fact defined by the equation:

$$V = E(T - T_o) \quad (1)$$

In practice, the thermocouple junction is placed for example in a furnace in which it is desired to measure the temperature T whilst the free ends are either at the ambient temperature or within an enclosure in which the temperature $T_o$ is well defined by a mixture of water and ice within a heat-insulated vessel. Alternatively, the free ends can be placed in a Peltier-effect device or else in an enclosure which is temperature-stabilized by another change of phase, preferably at a temperature in the vicinity of the ambient or environmental value.

The irksome requirement of a temperature-stabilized enclosure can be avoided by interposing an electronic circuit between the junction and the free ends of the thermocouple so as to correct the value of the electromotive force given by equation (1) when $T_o$ varies. In this case the right side of the equation is written as follows:

$$E(T - T_o) = E_1(T) - E_o(T_o) \quad (2)$$

Equation (1) therefore becomes:

$$V = E_1(T) - E_o(T_o) \quad (3)$$

whence $$E_1(T) = V + E_o(T_o) \quad (4)$$

This accordingly results in an electronic circuit which produces a voltage $V_o$ such that:

$$V_o = E_o(T_o) \quad (5)$$

Equation (4) then becomes:

$$E_1(T) = V + V_o \quad (6)$$

whence T is derived by utilizing the calibration curve.

It is therefore not possible to graduate $E_1(T)$ directly in degrees centigrade since $T_o$ is not fixed; furthermore, the circuit which gives the characteristic defined by equation (5) imposed by the nature of the thermocouple is relatively complex, thus constituting a further disadvantage.

SUMMARY OF THE INVENTION

The aim of the invention is to provide a remedy for the limitations mentioned in the foregoing. The device according to the invention is intended to carry out temperature stabilization of at least one connection point and essentially comprises at least one positive-temperature-coefficient resistor supplied at constant voltage, a good thermal contact being ensured between that portion of the device which is occupied by the connection point and the material constituting the positive-temperature-coefficient resistor.

BRIEF DESCRIPTION OF THE DRAWINGS

FIGS. 1(a) and (b) illustrate diagrammatically in a top and sectional view, respectively, the essential part of a device according to the invention which is applied to thermocouples;

FIG. 2 is one example of application of the invention to the temperature stabilization of two connection points;

DETAILED DESCRIPTION OF THE PREFERRED EMBODIMENTS

Figure 3:
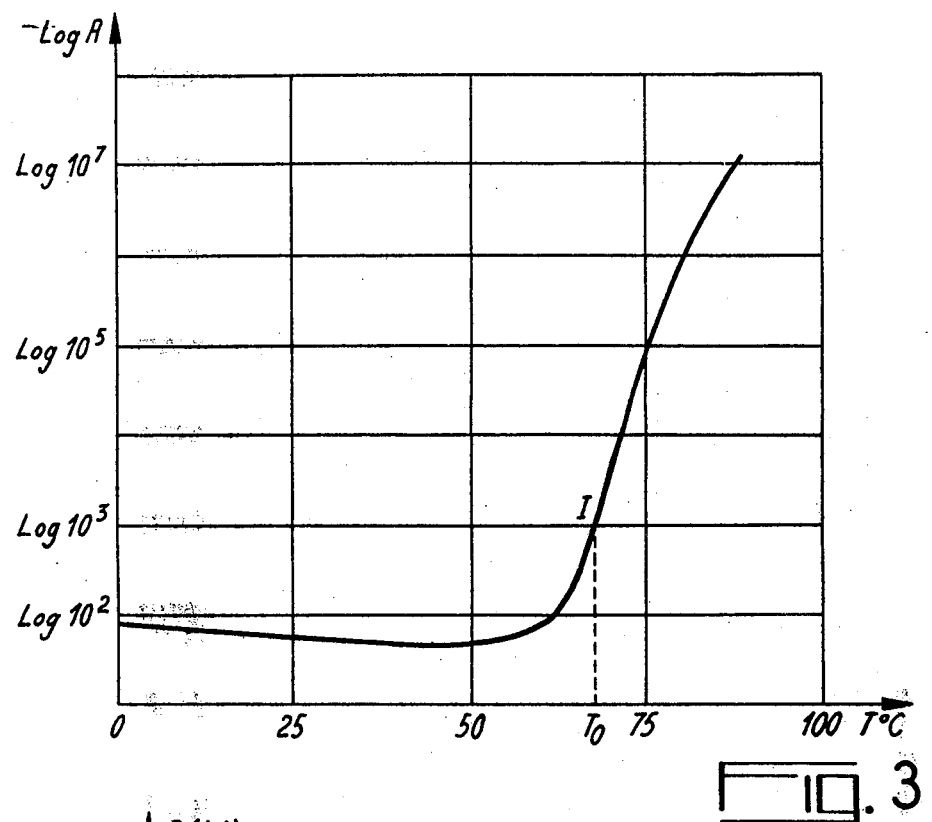
FIGS. 3, 4, 7, 8, 9 and 15 are explanatory curves.

In FIG. 1, the top view (a) and the sectional view (b) show the essential parts of a thermocouple 1 having two legs 11 and 12 which are constituted for example by copper and constantan, respectively. A soldered joint 100 at one end forms a junction between these two legs, thus constituting the thermocouple end to be introduced at the temperature-measurement point. The separate ends 110 and 120 located at the end opposite to the junction are thermally coupled to a component 2 having a self-regulated temperature. This component is essentially constituted by a parallelepipedal mass or plate 21 of ceramic material, the ohmic resistance of which has a positive coefficient of variation with temperature. A material or a resistor of this type is designated as "PTC" (positive temperature coefficient). By way of example it is conventional practice to employ a solid solution of SrTiO$_3$ and of BaTiO$_3$ to which Y$_2$O$_3$, SiO$_2$ or MnCO$_3$ has previously been added and sintered in accordance with ceramic techniques.

On a large face of the parallelepiped plate 21 is formed a deposit 22 of insulating resins having a sufficient thickness to embed the ends 110 and 120 of the thermocouple legs 11 and 12. Copper leads 13 and 14 are soldered to said ends 110 and 120 and are intended to be connected to a millivoltmeter (not shown in the drawings).

Two leads 23 and 24 are soldered to two opposite large faces of the parallelepiped plate 21 in order to connect the mass 21 to a d.c. or a.c. supply.

The self-regulated temperature of the component is determined by three main factors:

(1) the "ohmic resistance/temperature" characteristic (shown in FIG. 3) of the PTC material;

(2) the supply voltage V at the terminals of the PTC resistor determines the power P produced by Joule effect in respect of a value R of the ohmic resistance;

(3) the power $P_o$ dissipated by thermal leakages under predetermined conditions of ventilation and insulation.

In FIG. 3, the temperature in degrees centigrade from 0° to 100° C. has been plotted as abscissae and the logarithm of the value of resistance in ohms, especially from 10$^2$ to 10$^7$ ohms, has been plotted as ordinates. There is shown at I a point of inflexion of the curve in respect of a temperature $T_o$ (of the order of 60° C.) corresponding to a resistance of approximately 1000 ohms.

Figure 4:
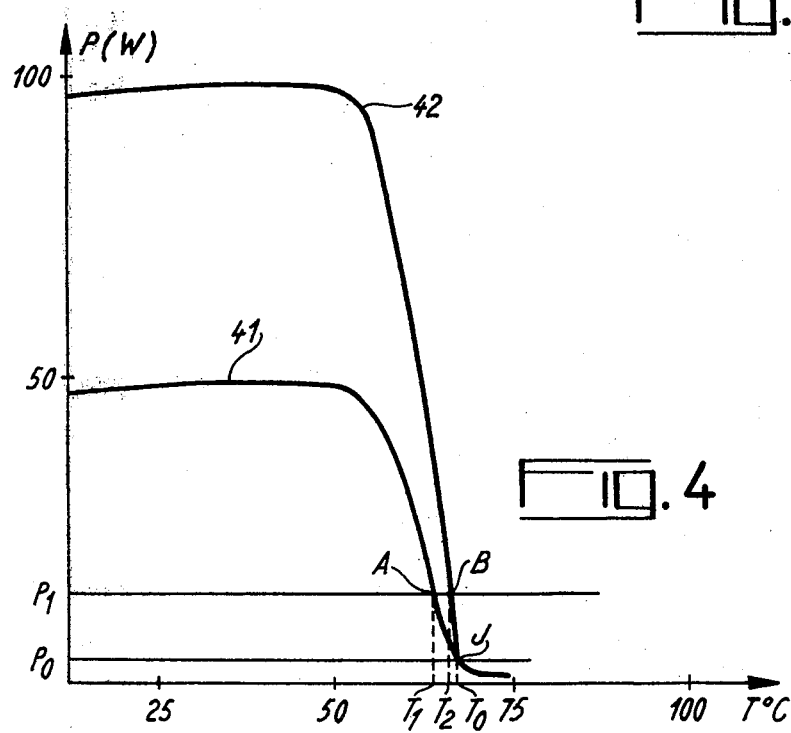

In FIG. 4, the temperatures have been plotted as abscissae on the same scale as in FIG. 3 and the power in watts has been plotted as ordinates. Two power curves 41 and 42 have been drawn and correspond to two values of the voltage V, namely 50 and 70 volts respectively.

If the thermal losses have a value $P_1$ in watts, it can readily be seen that the temperature is self-regulated according to the value of V at point A or at point B or to the values $T_1$ or $T_2$. In fact:

(a) if the temperature T tends to rise above the abscissa of point A (or B), the corresponding increase in resistance tends to cause a reduction in the power produced by Joule effect; in point of fact, the thermal losses do not decrease but rather have a tendency to increase as a function of the temperature rise; the temperature therefore tends to return to the value fixed by the abscissa of point A (or B).

(b) the reverse process takes place if T tends to fall below the abscissa of point A (or B).

If the thermal losses are reduced, for example, either by insulating the component or reducing its radiation, the thermal loss value comes close to the value $P_o$ corresponding to the ordinate of the point J of abscissa $T_o$, which is the point of inflexion I of the curve of FIG. 3.

Since the curves 41 and 42 practically coincide in the vicinity of the point J, the temperature T is then independent of the voltage applied from a threshold value which is of the order of 50 volts in this case.

However, it may be an advantage to remain in the vicinity of the points A and B or in other words not to reduce the thermal losses of the component to an excessive extent in order to improve the stability of the self-regulation temperature with respect to other causes of disturbances such as a current of hot or cold air, for example.

In the different possible embodiments of the device according to the invention, the PTC material can be formed in many different ways but three main conditions must be satisfied:

a good thermal contact must be established between the material points to be temperature-stabilized and the PTC material;

connections must be established between two selected points of the PTC material so as to ensure that the electric current flows through the PTC material under a sufficient thickness to obtain the temperature stabilization effect;

the PTC resistor must be electrically insulated;

furthermore, in the case of a thermocouple, the two conductors must be insulated with respect to each other.

In a first exemplified embodiment of the invention shown in FIG. 2, the PTC material is a plate 21 provided with at least one bore 210 lined with a cylindrical sleeve 211 of electrically insulating and heat-conducting material (alumina or polytetrafluoroethylene). The same material or an equivalent in the form of a sheet 212 is placed between a large face of the plate 21 and one or two copper plates 25 having a thickness of a few millimeters. Each plate 25 is provided with an internally threaded bore 250 having a diameter which is slightly smaller than that of the cylindrical sleeve 211 and also smaller than the diameter of a corresponding hole (not given a reference) formed in the sheet 212. The assembly is mounted so as to permit the attachment of a copper stud 26 which passes through the plate 21, through the sheet 212 and is screwed into the internally threaded bore 250 (or its unreferenced equivalent in FIG. 2). Leads 23 and 24 serve to supply the PTC resistor as in the case of the device shown in FIG. 1. The stud 26 is provided with a slot 261 for the use of a screwdriver in order to screw the stud into the plate 25. Furthermore, in a case of utilization which is similar to that of FIG. 1, a lead 13 (or 14) is soldered to the stud 26.

In the embodiment of FIG. 2, the thermal contact between lead 13 and plate 21 is improved by means of the copper plate 25 which is in contact with the plate 21 over a large area through the sheet 212, the thickness of which is reduced to 1 mm or less.

Figure 5:
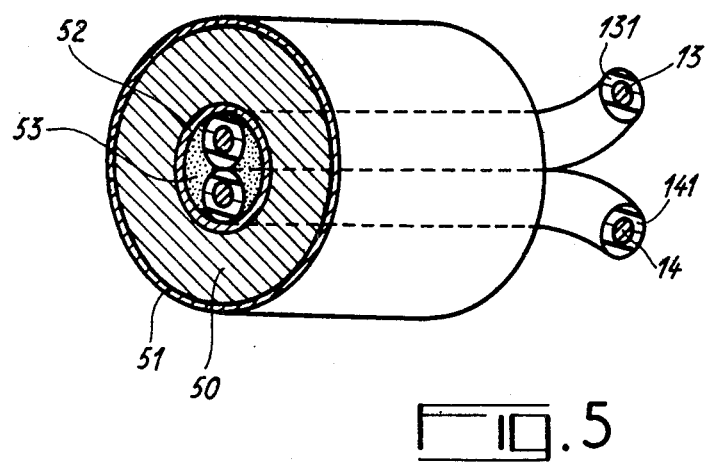
FIGS. 5, 6, 10 to 14, 16 illustrate further embodiments of the invention.

In a second type of construction, one example of which is illustrated in FIG. 5, the PTC material is in the form of a thick-walled cylindrical sleeve 50, two conductors 13 and 14 being housed at the center of said sleeve and electrically but not thermally insulated by means of a sheath (131, 141) of polytetrafluoroethylene. The leads (not shown) for supplying current to the PTC resistor are soldered to two metallic deposits 51 and 52 formed respectively on the (external and internal) cylindrical walls of the sleeve 50. A packing 53 of electrically insulating and heat-conducting material is inserted between the internal wall of the sleeve 50 and the sheaths 131 and 141 in order to improve the thermal contact.

Figure 6:
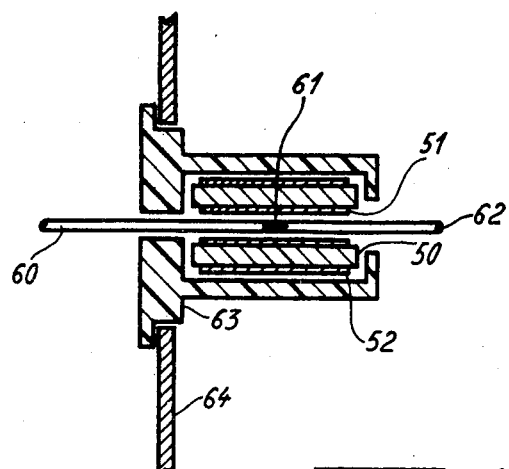

In another example of construction of the second type shown in FIG. 6, the material point to be temperature-stabilized is a junction 61 between two conductors 60 and 62. Such junction is located at the center of a sleeve 50 which is identical with that of FIG. 5 but on which the leads for supplying the PTC resistor have not been shown. In addition and by way of example, the cylindrical sleeve and the free ends of the conductors 60 and 62 have been housed coaxially within an insulating casing 63 inserted in the front face of a measuring instrument, only a portion of the front face 64 of the instrument being shown in the figure.

Apart from measurement by means of thermocouples, constructions of the type described above are applicable to temperature stabilization of a predetermined point of an electronic circuit, especially for measuring the "signal-to-noise" ratio.

There is described hereinafter an improvement of the invention relating to the construction of stabilized-temperature plug-in connectors which are intended to receive one or a number of connector-pins.

Figure 7:
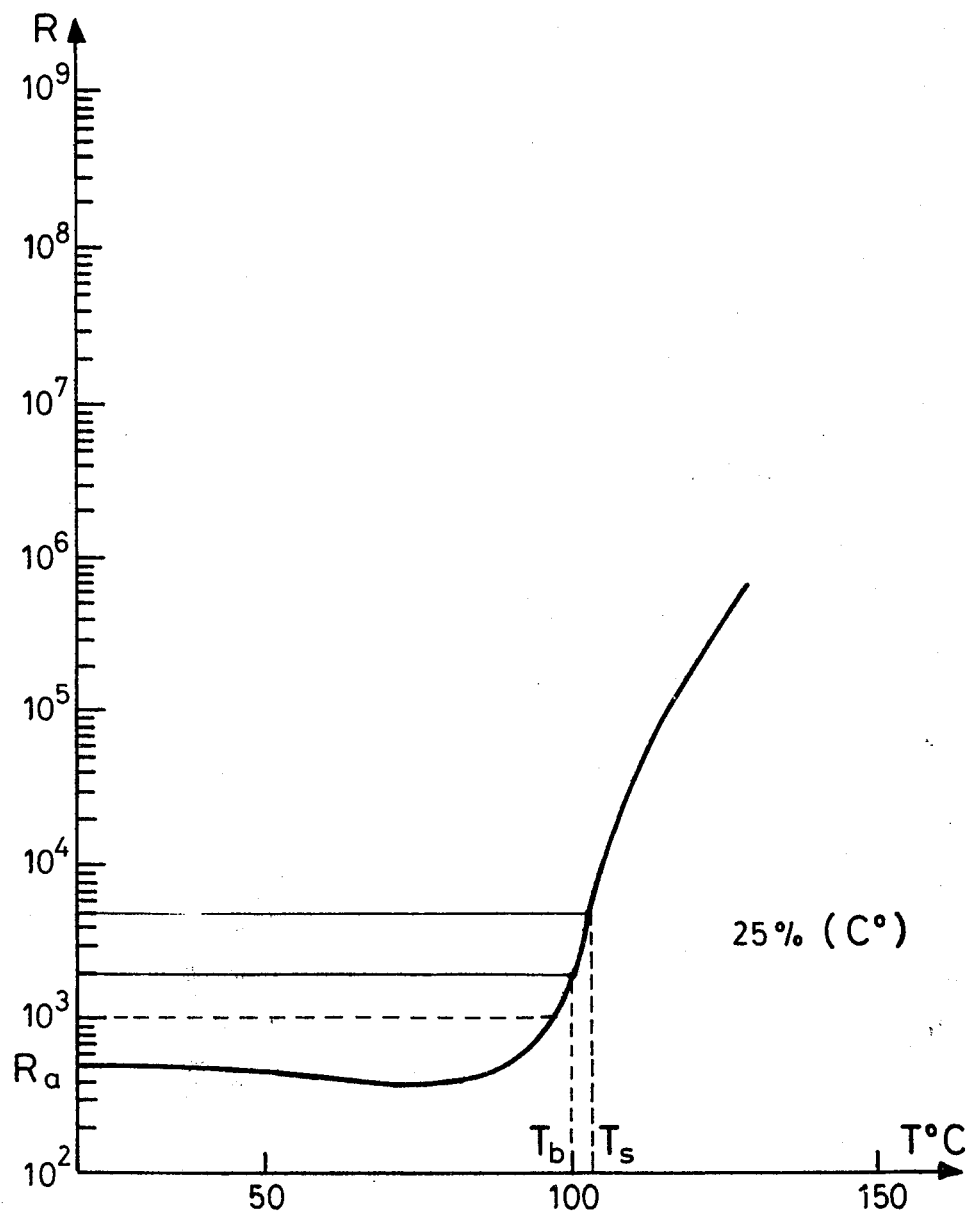

In FIG. 7, there is shown the curve of typical variation of the ohmic value of a PTC resistor as a function of its natural intrinsic temperature, the curve shown in the figure being represented by the equation:

$$\text{Log } R = f(T)$$

On this curve are defined the following parameters:

$R_a$: resistance value of the PTC resistor at ambient temperature;

$T_b$: transition temperature, that is to say the temperature at which the electrical resistance is equal to double the minimum resistance and, finally, $$\alpha = (\Delta \text{Ln } R / \Delta T) \cdot 100$$

or $$\alpha = (2.3 \Delta \log R / \Delta T) \cdot 100$$

which is the temperature coefficient or slope considered at one point of the curve, or $R(T) = 4 R_{min}$.

This curve first has a low slope before reaching the temperature $T_b$, then a much higher or steeper slope at the point of inflexion corresponding to a temperature $T_s$ or so-called stabilization temperature.

Figure 8:
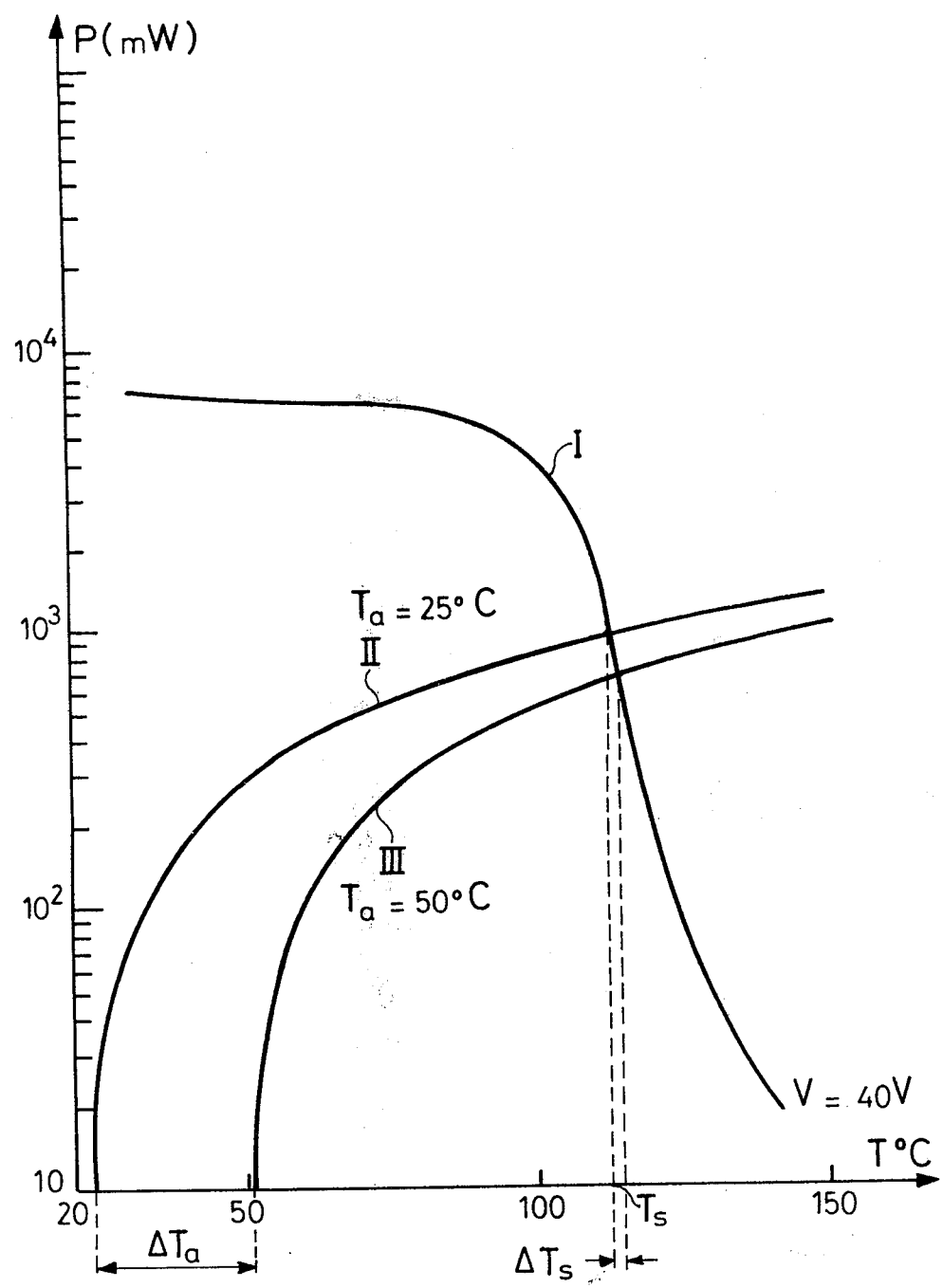

FIG. 8 shows at I the variations in the energy produced by Joule effect by the PTC resistor in respect of a voltage of 40 V applied to the terminals of the resistor as a function of its natural intrinsic temperature.

The reference $T_s$ designates a point of inflexion with a high slope. Its final temperature results from equilibrium between the electrical power output and the dissipated thermal power.

Curves II and III represent, respectively, the thermal power dissipated to the environment in respect of two ambient temperatures $T_a$, that is, respectively $T_a = 25°$ C. and $T_a = 50°$ C.

In the case of these two curves, the power in milliwatts (ordinates) is represented with a logarithmic scale. These are two logarithmic curves, the dissipated energy being a linear function of the difference $(T-T_a)$.

Since curve I has a very steep negative slope in the vicinity of $T_s$, the two curves II and III which are logarithmic curves intersect curve I at points which correspond to temperatures $T_s$ and $T_s + \Delta T_s$, or in other words which are close together.

The phenomenon of stabilization at the temperature $T_s$ can thus be readily understood.

Figure 9:
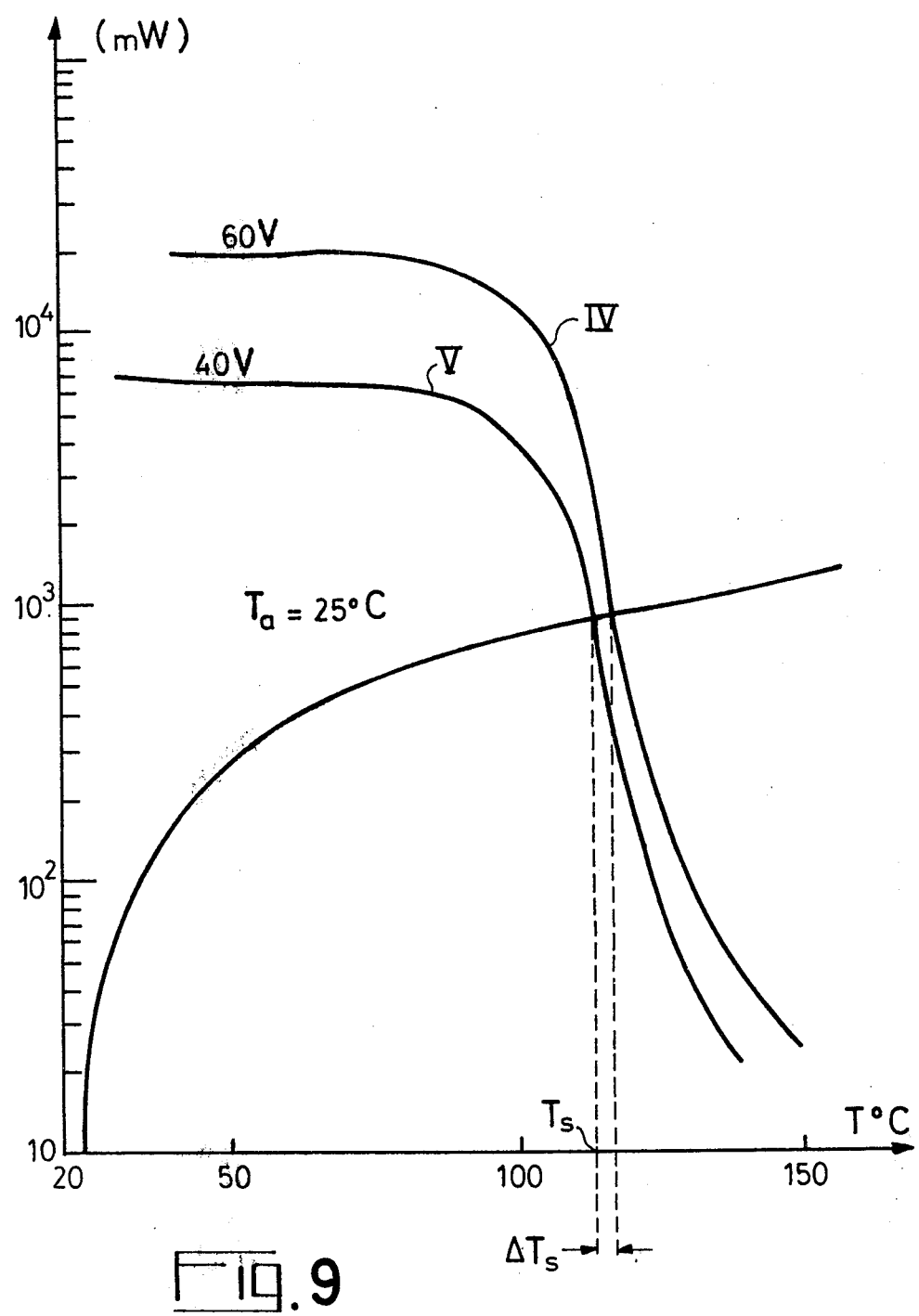

The set of curves of FIG. 9 shows as a function of the intrinsic temperature of the PTC resistor, in the same manner as in FIG. 8, two curves IV and V representing the Joule-effect power generated by the PTC resistor in respect of two different voltages 60 V and 40 V and curve II of FIG. 8 representing the power dissipated at the ambient temperature (room temperature) of 25° C. Similarly, it is apparent that the equilibrium corresponding to equality of the dissipated thermal power and of the power generated by Joule effect is obtained at the temperature $T_s$ and $T_s + \Delta T_s$.

This accordingly leads to the two following conclusions:

(a) the stabilization temperature $T_s$ is practically independent of the applied voltage.

(b) the temperature $T_s$ practically does not depend on the ambient temperature within the range indicated.

Two quality factors for products of this type are defined as follows:

(a) the factor $Q = \Delta T_a / \Delta T_s$ whilst the supply voltage V remains fixed, which is the ratio of variation in ambient temperature to the variation in stabilization temperature. As the ratio is higher, so the component is of better quality;

(b) the factor $q = \Delta V / \Delta T_s$ whilst the ambient temperature remains stationary, which is the ratio of variation in supply voltage to the corresponding variation in stabilization temperature.

Figure 10:
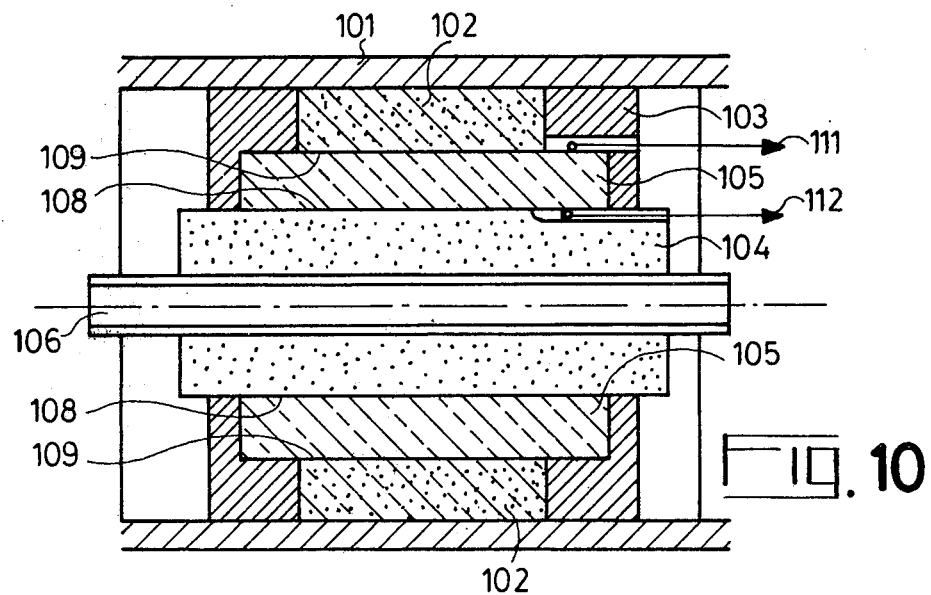

FIG. 10 is a sectional view of a plug-in connector comprising a PTC resistor designed in the form of a cylindrical sleeve.

Figure 12:
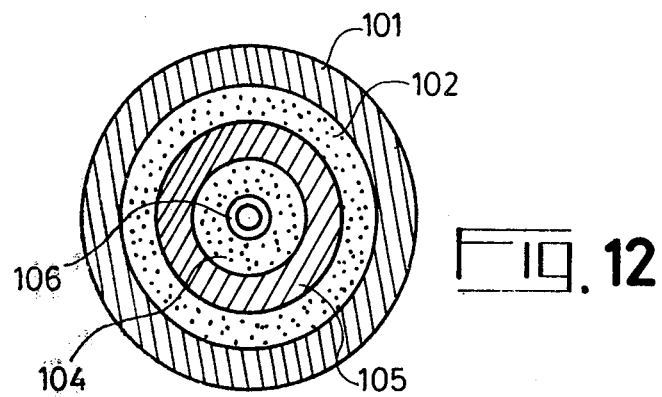
Figure 13:
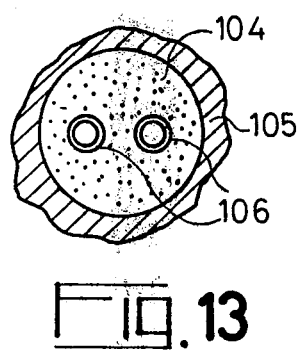

The connector includes a metallic casing 101, a heat insulator 102, two centering and insulating end-pieces 103, a sleeve 104 which provides electrical insulation but good thermal conductivity and is formed of alumina or beryllium oxide, the PTC resistor 105 proper which forms a sleeve, a metallic jack 106. Thick lines 108 and 109 serve to designate the internal and external metallic deposits of the PTC resistor which serve to supply electric current through leads 111 and 112. FIG. 12 is a sectional view of the connector taken at right angles to the axis of the metallic jack 106. It is also possible to form a connector including two jacks 106 (as shown in FIG. 13) or even three jacks (FIG. 14) or a greater number, the space formed between the jacks and the PTC resistor 105 being packed with the same material as the sleeve 104.

Figure 11:
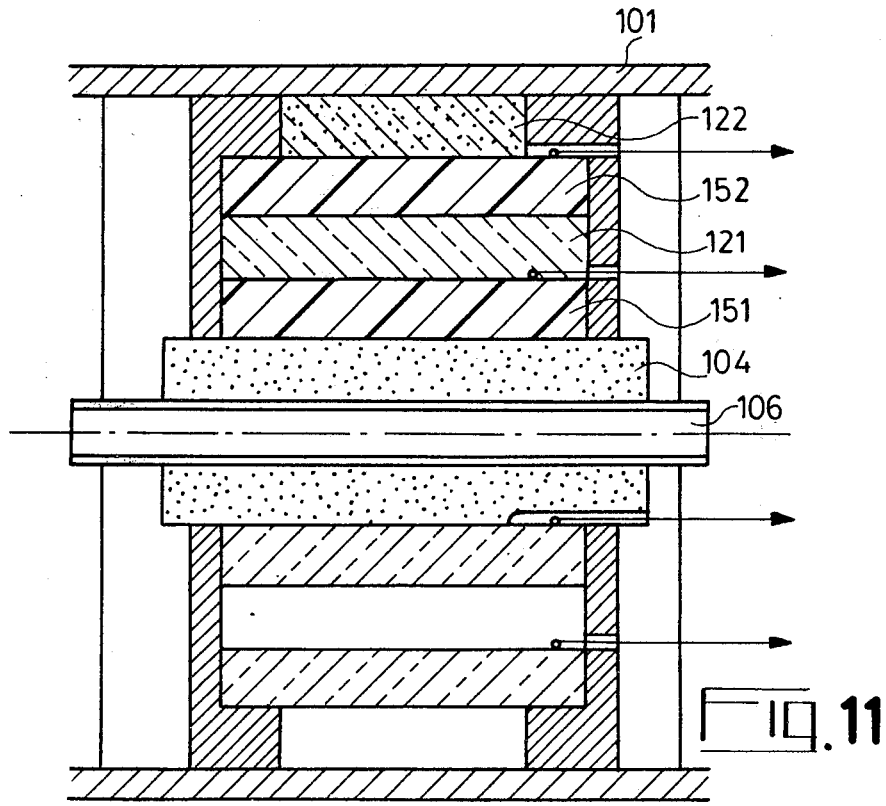
Figure 14:
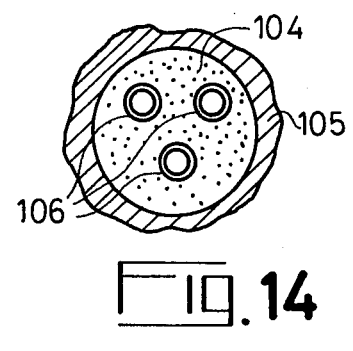

In an alternative design of plug-in connector, two PTC resistors are employed. Within a hollow PTC resistor 152, as shown in FIG. 11, there is placed a second PTC resistor 151 which is also of hollow design. The two PTC resistors are in the form of coaxial tubes which are of similar structure, the two tubes being separated by a layer 121 of heat-insulating material. FIGS. 13 and 14 are end views of connectors in which one, two or three conductors have been fitted within the jack.

Figure 15:
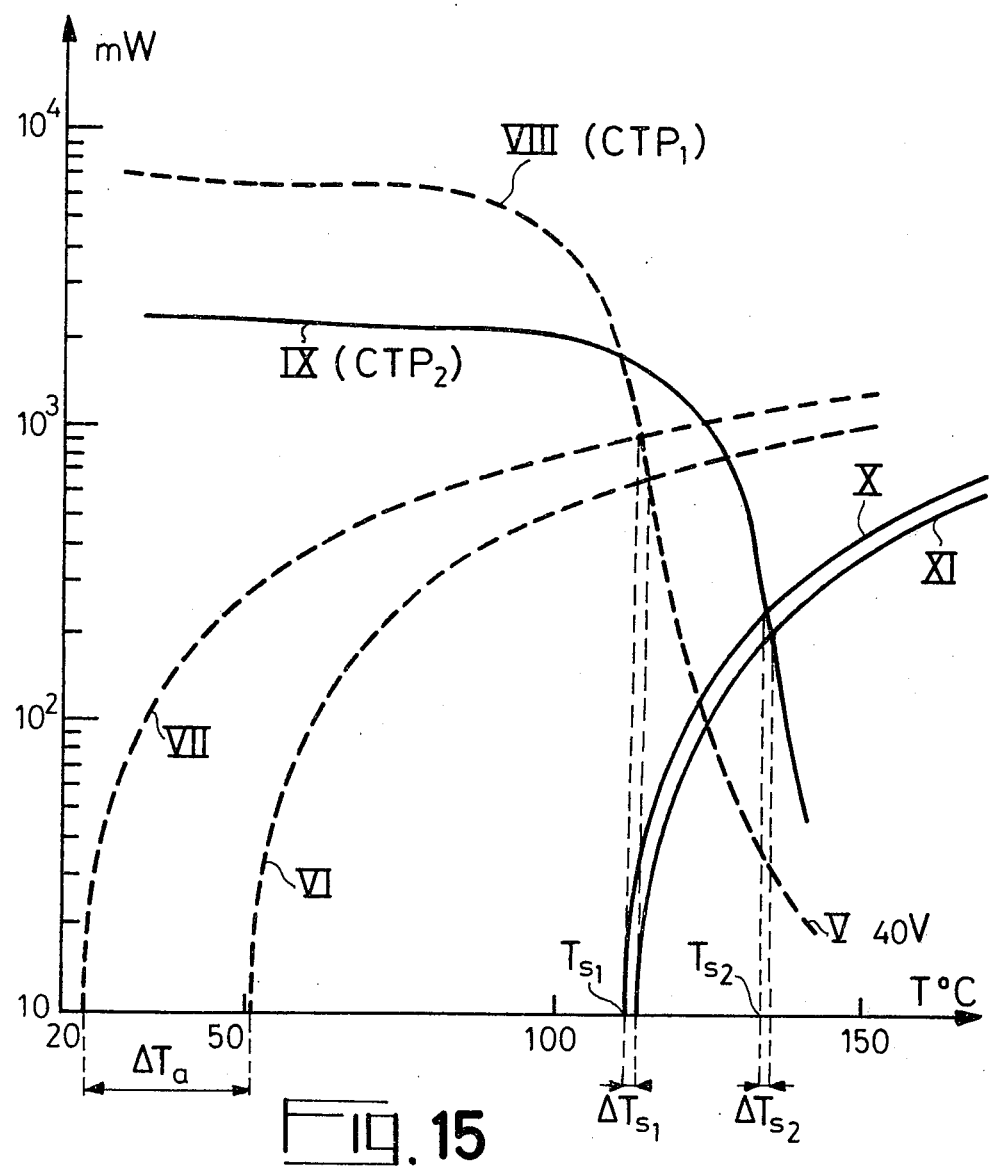

The outer PTC resistor performs a first function of stabilization and maintains a temperature $T_{s1}$ within the interior of the resistor. The operation of the complete assembly can readily be understood by reference to FIG. 15.

Curves VIII and IX correspond to the energies delivered at the same voltage by the two PTC resistors as a function of their respective intrinsic temperatures.

Curves VI and VII are the energies dissipated by the first PTC resistor or outer resistor $PTC_1$ in respect of ambient temperatures of 20° C. and 50° C. The first PTC resistor has a stabilization temperature within the range of $T_{s1}$ to $T_{s1} + \Delta T_{s1}$.

This temperature is substantially the temperature which prevails around the second resistor $PTC_2$. The final stabilization temperature will be within the range of $T_{s2}$ to $T_{s2} + \Delta T_{s2}$, where $\Delta T_{s2}$ will be considerably lower than $\Delta T_{s1}$.

It is clearly necessary to ensure that the temperature of the inner PTC resistor is higher than that of the outer PTC resistor. In the case of connectors having two PTC resistors, the quality parameters defined are the same as in the case of single connectors.

By way of example, the parameters of a few connectors according to the invention are given hereinafter.

EXAMPLE 1: connector having a single PTC resistor

Chemical composition:
 $(Ba_{0.90} Sr_{0.10})_{0.993} Y_{0.007} TiO_3 + 2\% TiO_2 + 0.004\% MnO + 1\% SiO_2$.

Technology of preparation of cylinders:
 Duration of 1st grinding operation: 30'
 Calcining temperature: 1050° C.
 Duration of 2nd grinding operation: 30'
 Isostatic pressing of cylinders: 2 Kbars/cm$^2$
 Sintering temperature: 1350° C.
 Duration of level-temperature stage: 1 hr
 Rate of temperature rise: 300° C./hr
 Rate of temperature decrease: 100° C./hr
 Machining and boring of central cavity
 Metallization by sintered silver coatings.

Geometrical characteristics of the hollow cylinder:
 length: 18 mm
 External diameter: 7 mm
 Internal diameter: 3 mm Electrical characteristics:
 $Ra = 500 \Omega$
 $Tb = 100°$ C.
 $\alpha = 40\%$/degree
 Supply voltage: 40 V Outer casing
 material: brass
 geometrical dimensions:
  length: 30 mm
  external diameter: 11 mm
  internal diameter: 9 mm The insulation between the casing and the PTC resistor is air.

The heat insulators placed at the ends of the connector also serve as a support for the PTC resistor within the connector.
 Material: teflon (trade name)
 Geometrical dimensions:
  thickness: 3 mm
  external diameter: 9 mm
  internal diameter: 3 mm.

Characteristics of temperature stabilization of the connector of this example in air at 25° C.:
 $Q = 20$
 $q = 7$ V/°C.
 $T_s = 110°$ C.

2nd EXAMPLE

The connector of the previous example is employed in this case at an ambient temperature of 50° C.
The characteristics then become:
 $Q = 17$
 $q = 6.5$ V/°C.
 $T_s = 111.5°$ C.

3rd EXAMPLE

The connector is similar to that of the first example with the following parameters:
Outer casing:
 length: 30 mm
 external diameter: 15 mm
 internal diameter: 13 mm The characteristics of stabilization are:
 $Q = 16$
 $q = 6.5$ V/°C.
 $T_s = 108°$ C.

4th EXAMPLE

The connector is similar to that of the 3rd example with the following parameters:
 Supply voltage: 50 V
There is obtained:
 $Q = 19$
 $q = 7$ V/°C.
 $T_s = 109.5°$ C.

5th EXAMPLE

The connector is identical with that of the first example and makes use of a silico-aluminous fiber as insulation between the PTC resistor and the outer casing.
There is obtained:
 $Q = 19$
 $q = 7$ V/°C.
 $T_s = 109.5°$ C.

These different examples show that the diversity of the geometrical dimensions, of the materials employed and of the voltage applied makes it possible to maintain the temperature stabilization characteristics of the connector within reasonable limits. For example, the stabilization temperature can be within the range of $-100°$ C. to 500° C. by varying the choice of basic materials used for PTC components. These materials consist of solid solutions of barium titanates, of titanates of elements taken from column II of the Periodic Table. The geometrical dimensions remain within the reasonable limits of standard connectors. On the other hand, the choice of insulating materials is very wide (alumina, silico-aluminous fiber, glass balls, mica and so forth).

EXAMPLES OF CONSTRUCTION OF CONNECTORS HAVING TWO PTC RESISTORS:

1st EXAMPLE

Characteristics of the two PTC components:
Chemical composition of the outer PTC resistor:
 $(Ba_{0.85} Sr_{0.15})_{0.993} Y_{0.007} TiO_3 + 2\% TiO_2 + 0.04\% MnO + 1\% SiO_2$ Chemical composition of the inner PTC resistor:
 The same composition as that of the first example of connector having a single PTC resistor.

Technology of preparation of PTC resistors:
 The same as the first example of connector having a single PTC resistor.

Geometrical characteristics of the outer PTC resistor:
 Length: 18 mm
 External diameter: 13 mm
 Internal diameter: 9 mm Geometrical characteristics of the inner PTC resistor:
 Length: 18 mm
 External diameter: 7 mm
 Internal diameter: 3 mm Electrical characteristics of the outer PTC resistor:
 $Ra = 750 \Omega$
 $Tb = 85°$ C.
 $\alpha = 22\%/°$C.

Electrical characteristics of the inner PTC resistor:
 The same characteristics as the first example.
 The two PTC resistors are supplied in parallel at 40 V.

Outer casing:
 Material: brass
 Geometrical dimensions:
  Length: 30 mm
  External diameter: 18 mm
  Internal diameter: 16 mm
Heat insulators between the metallic casing and the outer PTC resistor and between the two PTC resistors:
 air:
Heat insulators placed at the ends of the connector and also serving to support the PTC resistors:
 Material: teflon (trade name)
 Geometrical dimensions:
  Thickness: 3 mm
  External diameter: 16 mm
  Internal diameter: 3 mm
Characteristics of stabilization of the connector at 25° C.:
 Q = 100
 q = 8 V/°C.
 $T_s = 110°$ C.

2nd EXAMPLE

This example is similar to the first example but the heat insulators around the PTC resistors are silicoaluminous fibers.
There is thus obtained:
 Q = 96
 q = 8 V/°C.
 $T_s = 109.5°$ C.

3rd EXAMPLE

In this case the connector is identical with that of the first example but the supply voltage is 50 V (parallel connection).
There is thus obtained:
 Q = 96
 q = 7.5 V/°C.
 $T_s = 111°$ C.

4th EXAMPLE

In this case the connector is similar to that of the first example except for the following:
PTC components:
Inner PTC resistor:
 Length: 18 mm
 External diameter: 6 mm
 Internal diameter: 10 mm
 Ra = 400 Ω
The other characteristics remain unchanged.
Outer PTC resistor:
 Length: 18 mm
 External diameter: 16 mm
 Internal diameter: 12 mm
 Ra = 600 Ω
The other characteristics remain unchanged.
Supply voltage: 40 V in parallel.
Outer metallic casing:
 Length: 30 mm
 External diameter: 20 mm
 Internal diameter: 18 mm
There is thus obtained:
 Q = 100
 q = 8 V/°C.
 $T_s = 110°$ C.

The examples of construction given in the foregoing show that the parameters relating to the PTC components as well as the parameters relating to the metallic casing or to the insulators can be varied without appreciably modifying the quality of temperature stabilization of the connectors.

Figure 16:
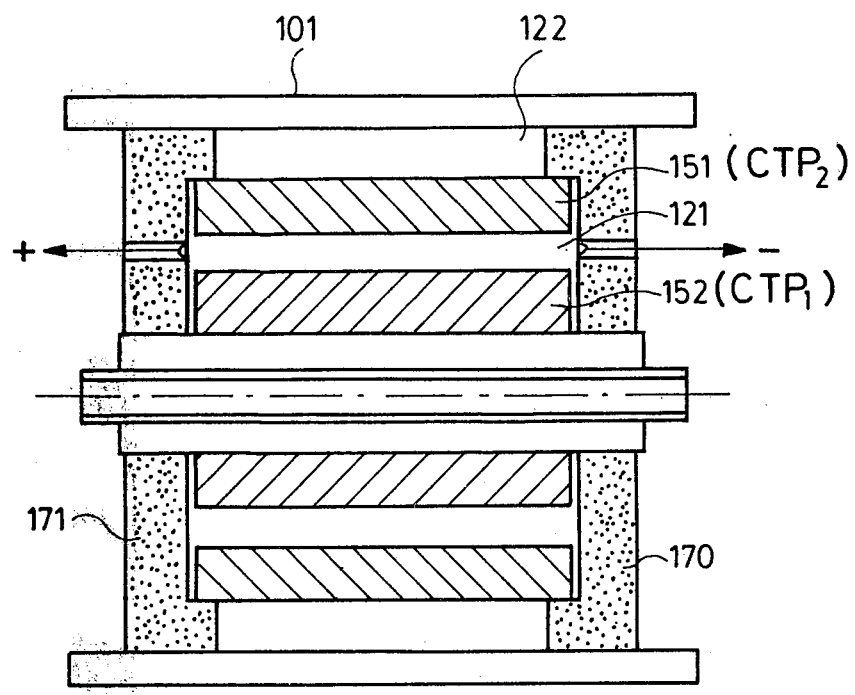

FIG. 16 is a sectional view showing a component which comprises two PTC resistors and is similar in design to the component shown in FIG. 11, but in which the supply current no longer flows radially but along the axis of the assembly.

The connector of FIG. 16 comprises the same elements as the connector of FIG. 11. The two PTC resistors are supplied through the flat faces. To this end, metal backings 170 and 171 are provided at the ends of the thermistors. The metal backings are connected to the terminals of a supply (not shown in the figure). Resistors of much higher value than in the previous case are thus obtained.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A self-regulated device for temperature-stabilization of at least one connection point, wherein said device comprises at least one positive-temperature-coefficient resistor supplied at constant voltage, a good thermal contact being ensured between that portion of the device which is occupied by the connection point and the material constituting said positive-temperature-coefficient resistor, said resistor comprising a cylindrical sleeve having metallized internal and external walls so as to permit the supply of current to the resistor, the interior of the bore being adapted to constitute a housing for the connection point to be temperature-stabilized.

2. A self-regulated device for temperature-stabilization of at least one connection point, wherein said device comprises at least one positive-temperature-coefficient resistor supplied at constant voltage, a good thermal contact being ensured between that portion of the device which is occupied by the connection point and the material constituting said positive-temperature-coefficient resistor, said device comprising a metallic casing, a heat insulator, a positive-temperature-coefficient resistor comprising a cylindrical sleeve placed within said casing and separated therefrom by said heat insulator, and at least one metallic jack, said resistor surrounding said heat-conducting and electrical insulating material in which is embedded said at least one metallic jack for receiving a connector-pin.

3. A self-regulated device for temperature-stabilization of at least one connection point, wherein said device comprises at least one positive-temperature-coefficient resistor supplied at constant voltage, a good thermal contact being ensured between that portion of the device which is occupied by the connection point and the material constituting said positive-temperature-coefficient resistor, said device comprising a metallic casing, a heat insulator, a first positive-temperature-coefficient resistor in the form of a cylindrical sleeve placed within said casing and separated therefrom by said heat insulator, a second positive-temperature-coefficient resistor wherein said first resistor surrounds said second positive-temperature-coefficient resistor and is separated therefrom by a heat-insulating and electrical insulating material, and at least one metallic jack, the second resistor comprising a cylindrical sleeve surrounding a heat-insulating and electrical insulating material in which is embedded said at least one metallic jack for receiving a connector-pin.

4. A device according to claim 3, wherein said first resistor comprises material having the following chemical composition:

$(Ba_{0.85} Sr_{0.15})_{0.993} Y_{0.007} TiO_3$: 97% approximately;
$TiO_2$: 2%
$SiO_2$: 1%
MnO: 0.04% and wherein the second resistor comprises material having the following chemical composition:

$(Ba_{0.9} + Sr_{0.1})_{0.993} Y_{0.007} TiO_3$: 97% approximately;
$TiO_2$: 2%
$SiO_2$: 1%
MnO: 0.004%.

5. A self-regulated device for temperature-stabilization of at least one connection point, wherein said device comprises at least one positive-temperature-coefficient resistor supplied at constant voltage, a good thermal contact being ensured between that portion of the device which is occupied by the connection point and the material constituting said positive-temperature-coefficient resistor wherein said positive-temperature-coefficient resistor comprises material having the following composition:

$(Ba_{0.9} + Sr_{0.1})_{0.993} Y_{0.007} TiO_3$; 97% approximately;
$TiO_2$: 2%
$SiO_2$: 1%
MnO: 0.04%.

* * * * *